(12) United States Patent
Pardo et al.

(10) Patent No.: US 11,055,222 B2
(45) Date of Patent: Jul. 6, 2021

(54) PREFETCHING OF COMPLETION NOTIFICATIONS AND CONTEXT

(71) Applicant: Mellanox Technologies, Ltd., Yokneam (IL)

(72) Inventors: Ilan Pardo, Ramat Hasharon (IL); Noam Bloch, Bat Shlomo (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 106 days.

(21) Appl. No.: 16/565,510

(22) Filed: Sep. 10, 2019

(65) Prior Publication Data

US 2021/0073130 A1   Mar. 11, 2021

(51) Int. Cl.
*G06F 12/08* (2016.01)
*G06F 12/0831* (2016.01)
(Continued)

(52) U.S. Cl.
CPC .......... *G06F 12/0835* (2013.01); *G06F 3/061* (2013.01); *G06F 3/0656* (2013.01); *G06F 3/0685* (2013.01); *G06F 9/466* (2013.01); *G06F 13/1673* (2013.01); *G06F 13/28* (2013.01); *G06F 16/907* (2019.01); *G06F 2213/3808* (2013.01)

(58) Field of Classification Search
CPC .... G06F 12/0835; G06F 3/0685; G06F 3/061; G06F 3/0656; G06F 9/466; G06F 16/907; G06F 13/28; G06F 13/1673; G06F 2213/3808
See application file for complete search history.

(56) References Cited

U.S. PATENT DOCUMENTS 5,671,365 A   9/1997   Binford et al.
5,875,343 A   2/1999   Binford et al.
(Continued)

OTHER PUBLICATIONS

Patel et al, "A Model of Completion Queue Mechanisms using the Virtual Interface API", Proceedings of IEEE International Conference on Cluster Computing, pp. 280-288, Nov. 28-Dec. 1, 2000.
(Continued)

*Primary Examiner* — Hiep T Nguyen
(74) *Attorney, Agent, or Firm* — Kligler & Associates Patent Attorneys Ltd

(57) ABSTRACT

Computing apparatus includes a central processing unit (CPU), including at least one core and a cache in physical proximity to the at least one core, with a system memory and a bus connecting the CPU to the memory. A peripheral device is connected to the bus and is configured to write data items via the bus to a buffer in the system memory and to write respective completion reports to the system memory upon writing the data items to the buffer. The peripheral device is configured to detect that the CPU has read a first completion report from the system memory and then read context metadata associated with the first completion report from a given address in the system memory, and is further configured, upon writing a second completion report subsequent to the first completion report and associated with the same context metadata, to stash the second completion report and the context metadata from the given address to the cache.

24 Claims, 4 Drawing Sheets

(51) Int. Cl.
*G06F 13/16* (2006.01)
*G06F 13/28* (2006.01)
*G06F 3/06* (2006.01)
*G06F 16/907* (2019.01)
*G06F 9/46* (2006.01)

(56) References Cited

U.S. PATENT DOCUMENTS

| | | | |
|---|---|---|---|
| 6,085,227 | A | 7/2000 | Edlund et al. |
| 6,718,370 | B1 | 4/2004 | Coffman et al. |
| 7,152,122 | B2 | 12/2006 | Kagan et al. |
| 7,404,190 | B2 | 7/2008 | Krause et al. |
| 7,761,619 | B2 | 7/2010 | Feng et al. |
| 8,291,135 | B2 | 10/2012 | Subramanian et al. |
| 8,612,374 | B1 * | 12/2013 | Amdahl ............... H04L 41/147 706/21 |
| 8,924,605 | B2 | 12/2014 | Hayut et al. |
| 8,959,265 | B2 | 2/2015 | Hayut et al. |
| 9,871,734 | B2 | 1/2018 | Kagan et al. |
| 10,021,031 | B1 * | 7/2018 | Banse ................... H04L 47/20 |
| 2003/0065856 | A1 | 4/2003 | Kagan et al. |
| 2005/0091406 | A1 * | 4/2005 | Madukkarumukumana ............... H04L 29/06 709/246 |
| 2006/0221929 | A1 * | 10/2006 | Le Moigne ............ H04L 69/32 370/351 |
| 2007/0033285 | A1 | 2/2007 | Shiigi et al. |
| 2008/0091868 | A1 | 4/2008 | Mizrachi et al. |
| 2008/0155154 | A1 | 6/2008 | Kenan et al. |
| 2011/0010557 | A1 | 1/2011 | Kagan et al. |
| 2013/0054858 | A1 | 2/2013 | Bugge |
| 2013/0124929 | A1 | 5/2013 | Harada et al. |
| 2013/0311488 | A1 | 11/2013 | Erdogan et al. |
| 2015/0169470 | A1 * | 6/2015 | Newlin ................. G06F 12/122 709/203 |
| 2016/0378709 | A1 * | 12/2016 | Menachem ......... G06F 11/3027 710/308 |
| 2018/0267919 | A1 * | 9/2018 | Burstein ............. G06F 13/4027 |

OTHER PUBLICATIONS

InfiniBandTM Architecture Specification, vol. 1, Release 1.2.1, relevant pp. 445-449, Nov. 2007.

Mellanox Adapters Programmer's Reference Manual (PRM) Supporting ConnectX®-4 and ConnectX®-4 Lx Revision 0.40, relevant pp. 115-132, year 2016.

Voks et al., U.S. Appl. No. 16/458,073, filed Jun. 30, 2019.

ARM® AMBA® 5 CHI Architecture Specification, Cambridge, England, relevant pp. 223-230 (Chapter 7), year 2017.

* cited by examiner

PREFETCHING OF COMPLETION NOTIFICATIONS AND CONTEXT

FIELD OF THE INVENTION

The present invention relates generally to computer systems, and particularly to input/output (I/O) devices and their interaction with host computing devices.

BACKGROUND

Host processors typically connect to a packet network, such as an InfiniBand® or Ethernet switch fabric, via a network interface controller (NIC). After the NIC has finished performing a communication task, for example reception of an incoming data packet and writing the packet data to host memory (also referred to as the "main memory" or "system memory"), the NIC submits a completion report to the host processor. In many high-speed computing systems, the completion report takes the form of a data structure known as a completion queue element (CQE), which the NIC writes to a completion queue in the memory. The host processor, under control of software, reads the CQEs from the completion queue, and uses the information in the CQEs in accessing and processing the packet data in the memory.

Most host processors comprise a central processing unit (CPU) with one or more processing cores and at least one small cache memory (also referred to simply as a cache) in proximity to each core, in order to reduce latency and increase throughput of CPU operations. The cache typically includes a cache controller, which fetches data from the main host memory into the cache when requested by the processing core. Various strategies and architectures are known in the art for prefetching data into the cache from the main host memory when it is predicted that the CPU will shortly need to use the data.

Cache stashing is a technique in which another processing element, such as a direct memory access (DMA) engine in a peripheral device, allocates a cache line into a cache that belongs to another processor, on behalf of that processor, based upon the assumption that the processor will use the data at a later time. Rather than waiting for the software running on the processor to "touch" a particular address in order to allocate it into the cache, the cache controller is modified to allow DMA agents to allocate data into the cache. Later on, when the software is ready to access the data, it is already present in the cache, thus eliminating some of the latency that would have otherwise been occurred in fetching the data from the main memory. For example, U.S. Pat. No. 7,774,522 describes a method for cache stashing of processor control messages. Cache stashing is also offered by the ARM® AMBA® 5 CHI processor architecture, as described in the *ARM AMBA 5 CHI Architecture Specification*, published by ARM Ltd. (Cambridge, England), 2017, in Chapter 7, which is incorporated herein by reference.

SUMMARY

Embodiments of the present invention that are described hereinbelow provide improved methods and devices that facilitate efficient interaction between a peripheral device and a CPU.

There is therefore provided, in accordance with an embodiment of the invention, computing apparatus, including a central processing unit (CPU), including at least one core and a cache in physical proximity to the at least one core, with a system memory and a bus connecting the CPU to the memory. A peripheral device is connected to the bus and is configured to write data items via the bus to a buffer in the system memory and to write respective completion reports to the system memory upon writing the data items to the buffer. The peripheral device is configured to detect that the CPU has read a first completion report from the system memory and then read context metadata associated with the first completion report from a given address in the system memory, and is further configured, upon writing a second completion report subsequent to the first completion report and associated with the same context metadata, to stash the second completion report and the context metadata from the given address to the cache.

In a disclosed embodiment, the peripheral device includes a network interface controller (NIC), and the data items include data packets that are received by the NIC from a network.

Additionally or alternatively, the CPU includes multiple cores and multiple, respective caches, and the peripheral device is configured to write the completion reports to multiple, different completion queues, including at least one respective completion queue for each of the cores, and to stash the completion reports and context metadata to the multiple, respective caches, depending upon the completion queues to which each of the completion reports is written.

In some embodiments, the peripheral device is configured to assign a respective context identifier to each completion report that it writes to the system memory, such that the completion reports that share the same context metadata are assigned the same identifier, and the peripheral device applies the context identifier in selecting the context metadata to be stashed when writing the completion reports subsequent to the first completion report.

In one embodiment, the peripheral device is configured to detect that the CPU has read the first completion report and then read the context metadata by sniffing data transactions on the bus. Alternatively, the peripheral device is configured to detect that the CPU has read the first completion report and then read the context metadata by detecting interactions between the at least one core and the cache.

In some embodiments, the peripheral device is configured to identify the given address of the context metadata by tracking addresses accessed by the CPU in the system memory after detecting that the CPU has read the first completion report. In a disclosed embodiment, the peripheral device is configured to identify multiple addresses accessed by the CPU after detecting that the CPU has read the first completion report, and then to stash the context metadata from the multiple addresses to the cache upon writing the second completion report.

There is also provided, in accordance with an embodiment of the invention, a peripheral device, including a bus interface, which is configured to connect to a bus for connection to a central processing unit (CPU), including at least one core and a cache in physical proximity to the at least one core, and to a system memory, and to read and write data to and from the system memory by direct memory access (DMA). Processing circuitry is configured to write data items via the bus interface to a buffer in the system memory and to write respective completion reports to the system memory upon writing the data items to the buffer, and is configured to detect that the CPU has read a first completion report from the system memory and then read context metadata associated with the first completion report from a given address in the system memory, and is further configured, upon writing a second completion report subsequent to the first completion report and associated with the same context metadata, to stash the second completion report and the context metadata from the given address to the cache.

There is additionally provided, in accordance with an embodiment of the invention, a method for computing, which includes writing data items from a peripheral device via a bus, which connects the peripheral device to a central processing unit (CPU), including at least one core and a cache in physical proximity to the at least one core and a system memory, to a buffer in the system memory. Respective completion reports are written from the peripheral device to the system memory upon writing the data items to the buffer. It is detected that the CPU has read a first completion report from the system memory and then read context metadata associated with the first completion report from a given address in the system memory. Upon writing a second completion report subsequent to the first completion report and associated with the same context metadata, the second completion report and the context metadata from the given address are stashed to the cache.

The present invention will be more fully understood from the following detailed description of the embodiments thereof, taken together with the drawings in which:

DETAILED DESCRIPTION OF EMBODIMENTS

Figure 1:
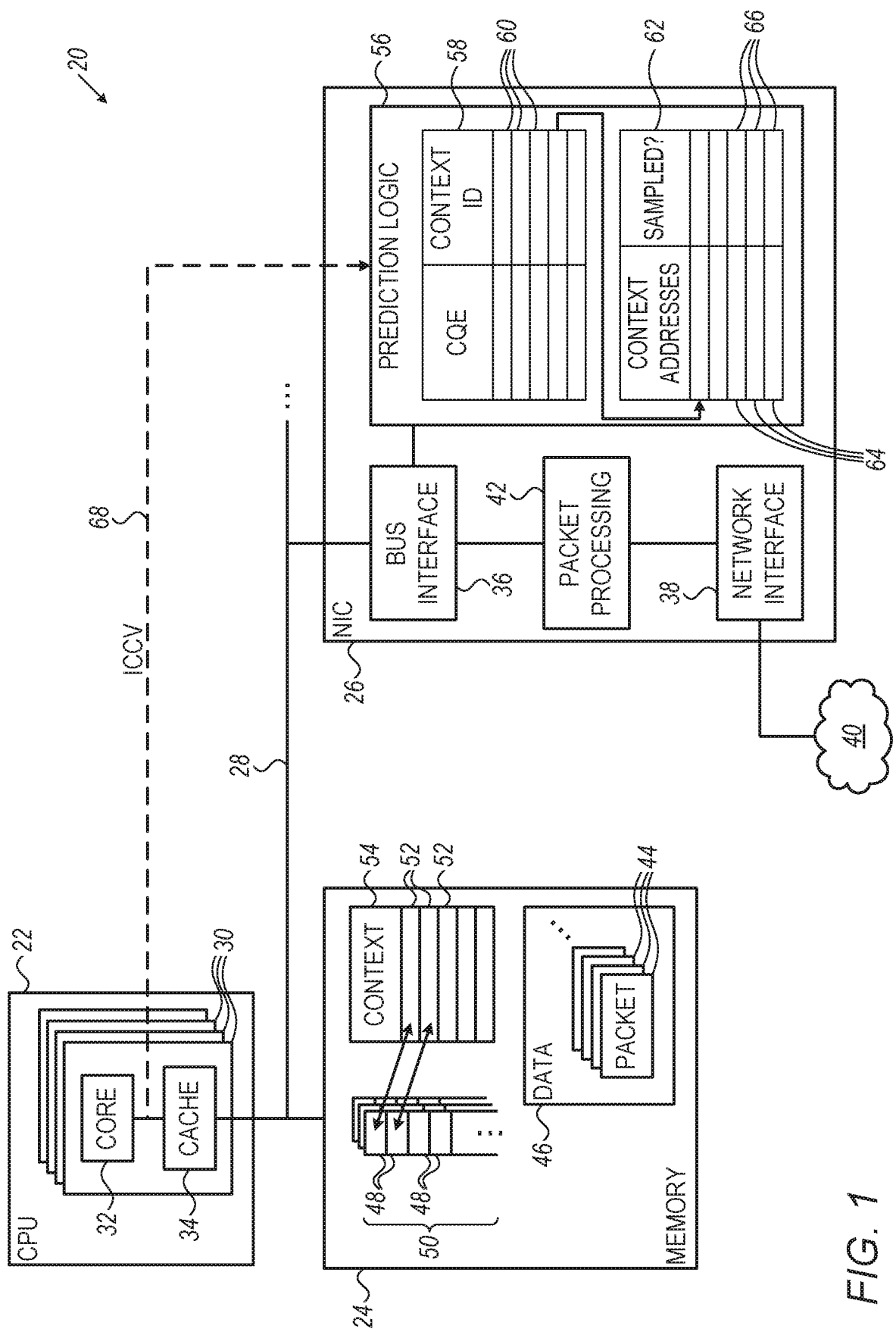
FIG. 1 is a block diagram that schematically illustrates a computing apparatus, in accordance with an embodiment of the invention.

As explained above, in systems that are known in the art, peripheral devices, such as a NIC, write data items via a bus to a buffer in the system memory, and then write respective completion reports to a completion queue in the system memory. In a CPU with multiple cores, each core will typically have its own completion queue (or set of completion queues), and the peripheral device will write each completion report to the completion queue of the core that is to process the corresponding data items. The CPU fetches and reads the completion reports from the queue (either by periodic polling or in response to interrupts, for example), and then uses the information in the completion reports to fetch and process the corresponding data items from the system memory.

In order to process any given data item, the CPU will typically make use of context metadata, which is associated with the corresponding completion report and is also stored in the system memory. For example, assuming the peripheral device to be a NIC, and the data items to be data packets that the NIC has received from a network, the context metadata may include rules to be applied by the processing core to the packet header fields. Typically, the CPU will use the same context metadata in processing multiple, successive data items in a given category, such as data packets with the same source and/or destination address, and will maintain multiple sets of context metadata for the different categories of data items that it receives and processes. The completion report written by the peripheral device contains information, such as packet address information, that is indicative of the category to which the corresponding data item belongs. In general, however, the context metadata are generated and maintained by software running on the CPU, without involvement by the peripheral device in the content or storage location of the context metadata.

Upon reading each completion report from the completion queue, the CPU will identify the category of the corresponding data item and will attempt to read the contents of the memory address where the context metadata for this category is stored. When this address is invalid in the local cache, the cache controller will fetch the context metadata from the system memory, followed by the data item indicated by the completion report. The cache replacement that is required each time new context metadata must be fetched from the memory increases the processing latency and may decrease the data throughput of the system.

Embodiments of the present invention that are described herein address this problem by enabling peripheral devices to predict and stash both completion reports and the associated context metadata in the cache of the CPU, before they are needed by the software running on the CPU. For this purpose, the peripheral device detects that the CPU has read a first completion report from the completion queue, and then detects that the CPU has read context metadata associated with this first completion report from a given address in the system memory. Once the address of the context metadata has been detected in this fashion and associated with the completion report, the peripheral device can predict when the CPU will need the context metadata to process further completion reports, and can then stash the context metadata from this address to the cache before the CPU needs to use it.

This stashing mechanism is invoked when the peripheral device writes a subsequent completion report that is associated with the same context metadata as the first completion report (for example, because it relates to a data packet belonging to the same category, having the same source and/or destination address). The peripheral device will then stash the completion report and the associated context metadata from the corresponding addresses in the system memory to the cache. When the CPU software is ready, shortly thereafter, to read and process the completion report, it will be able to access the completion report and metadata immediately, without waiting for a cache replacement.

FIG. 1 is a block diagram that schematically illustrates a computing apparatus 20, in accordance with an embodiment of the invention. Apparatus 20 comprises a central processing unit (CPU) 22, which is connected to a system memory 24 and a NIC 26 by a bus 28. For example, bus 28 may comprise a peripheral component interconnect bus, such as a PCIe® bus, or a system interconnect bus in a system on chip (SoC). Although bus 28 is shown schematically in FIG. 1 as a simple linear element, in practice the bus may have any suitable sort of topology that is known in the art, such as a star, mesh, ring or torus, for example; and all such bus topologies are considered to be within the scope of the claims listed below. CPU 22 comprises one or more core complexes 30, each comprising a processing core 32 and a local cache 34 in physical proximity to the core, as is known in the art. Cache 34 is configured to enable stashing by peripheral devices, such as NIC 26, for example as provided by the above-mentioned ARM AMBA 5 CHI processor architecture.

NIC 26 comprises a bus interface 36, which connects to bus 28, and a network interface 38, which connects to a packet data network 40, such as an Ethernet or InfiniBand switch fabric. Bus interface 36 comprises logic circuits that are able to write and read data to and from memory 24 by direct memory access (DMA). Network interface 38 comprises physical layer (PHY) and medium access control (MAC) interface circuits that are able to transmit and receive data packets to and from network 40. Packet processing circuitry 42, coupled between bus interface 36 and network interface 38, receives packet transmission requests from software running on CPU 22 and transmits packets accordingly through network interface 38, and similarly receives data items, such incoming packets from the network interface, and conveys them to memory 24 for processing by CPU software. These elements of NIC 26 are well known in the art, and further details are omitted here for the sake of brevity.

Upon receiving a data packet from network 40, packet processing circuitry 42 writes corresponding packet data 44 via bus interface 36 to a buffer 46 in memory 24. For each packet or sequence of packets (for example in a multi-packet message), packet processing circuitry 42 writes a respective completion report, in the form of a CQE 48, to a completion queue 50 in memory 24. Memory 24 may hold multiple completion queues 50 of this sort, for example with a separate completion queue (or group of completion queues) for each processing core 32. Typically, although not necessarily, the completion queues are configured as cyclical rings, each holding a predefined number of CQEs of a predefined size; but alternatively, the completion queues may comprise other sorts of data structures.

Each core 32 reads CQEs 48 from its assigned completion queue 50 in sequence, under the control of software running on CPU 22. Each CQE 48 points to the location of the corresponding packet data 44 in buffer 46. In addition, by reading the CQE, the software is able to categorize the data packet to which it corresponds (for example on the basis of packet address information and/or other packet header fields). Based on the packet category, the software identifies context metadata 54 at one or more addresses 52 in memory 24 for use in processing packet data 44. Core 32 reads the context metadata, as well as the packet data, and applies the appropriate processing operations to the data. Details of these processing operations and the context metadata that are maintained and used in apparatus 20 are determined by the software running on CPU 22 and are beyond the scope of the present description.

As noted above, and described in further detail hereinbelow, when NIC 26 writes a CQE 48 to completion queue 50, it may also attempt to stash the CQE into cache 34 of the core 32 to which the completion queue belongs, along with corresponding context metadata 54 from the appropriate address or addresses 52 in memory 24. For this purpose, NIC 26 comprises prediction logic 56, whose function is to identify the location of the context metadata that are associated with each CQE and thus to stash the appropriate context metadata into cache 34 when needed. Prediction logic 56 typically comprises digital logic circuits, which may be hard-wired or programmable, for carrying out the functions that are described herein, together with memory that holds the data structures that the prediction logic uses for these purposes.

Alternatively or additionally, prediction logic 56 may comprise an embedded microcontroller, which performs these functions under the control of suitable software or firmware. Although prediction logic 56 and packet processing circuitry 42 are shown in FIG. 1, for the sake of conceptual clarity, as separate functional blocks, in practice these functionalities may be combined within the processing core of NIC 26; and the term "processing circuitry" is used in the present description and in the claims to refer collectively to prediction logic 56 and packet processing circuitry 42.

For purposes of identifying addresses 52 of context metadata 54 that are associated with each CQE 48, prediction logic 56 maintains a CQE table 58, which lists a context identifier (ID) 60 for each CQE that has been written by NIC 26 to completion queue 50. Packet processing circuitry 42 assigns a context ID to each CQE depending on the category to which the corresponding data packet belongs. For example, programmable classification logic within circuitry 42 may assign the context ID depending upon certain fields in the packet header. Consequently, CQEs having the same assigned context ID will generally share the same context metadata. Each context ID 60 in turn points to an entry 64 in an address tracking table 62, where prediction logic 56 writes addresses 52 of context metadata 54 that are associated with CQEs 48 having this context ID. Each entry 64 contains a valid flag 66, which is set to indicate that the entry is complete and up to date. Typically, each flag 66 is cleared periodically by an aging timer, to ensure that entries 64 are updated regularly.

In addition, prediction logic 56 maintains a shadow producer index and a shadow consumer index for each completion queue 50, which respectively indicate the last CQE 48 that was written to the completion queue by NIC 26 and the last CQE that was read from the completion queue by CPU 22. (These indexes are referred to as "shadows" because they are typically inferred by the prediction logic, rather than updated directly by the components that actually do the producing and consuming.)

The figures and description that follow present details of the operation of prediction logic 56 in filling in the information in CQE table 58 and address tracking table 62, and then applying this information in stashing CQEs 48 and context metadata 54 to cache 34. In order to obtain addresses 52 of the context metadata for each context ID 60, prediction logic 56 typically sniffs and analyzes data transactions on bus 28, including memory read operations performed by CPU 22, as well as write operations performed by NIC 26 in writing CQEs 48 to completion queue 50. Alternatively or additionally, prediction logic 56 may detect interactions between processing core 32 and cache 34 via an internal core cluster visibility (ICCV) link 68, as is known in the art, and may use this information in filling in its tables.

Figure 2:
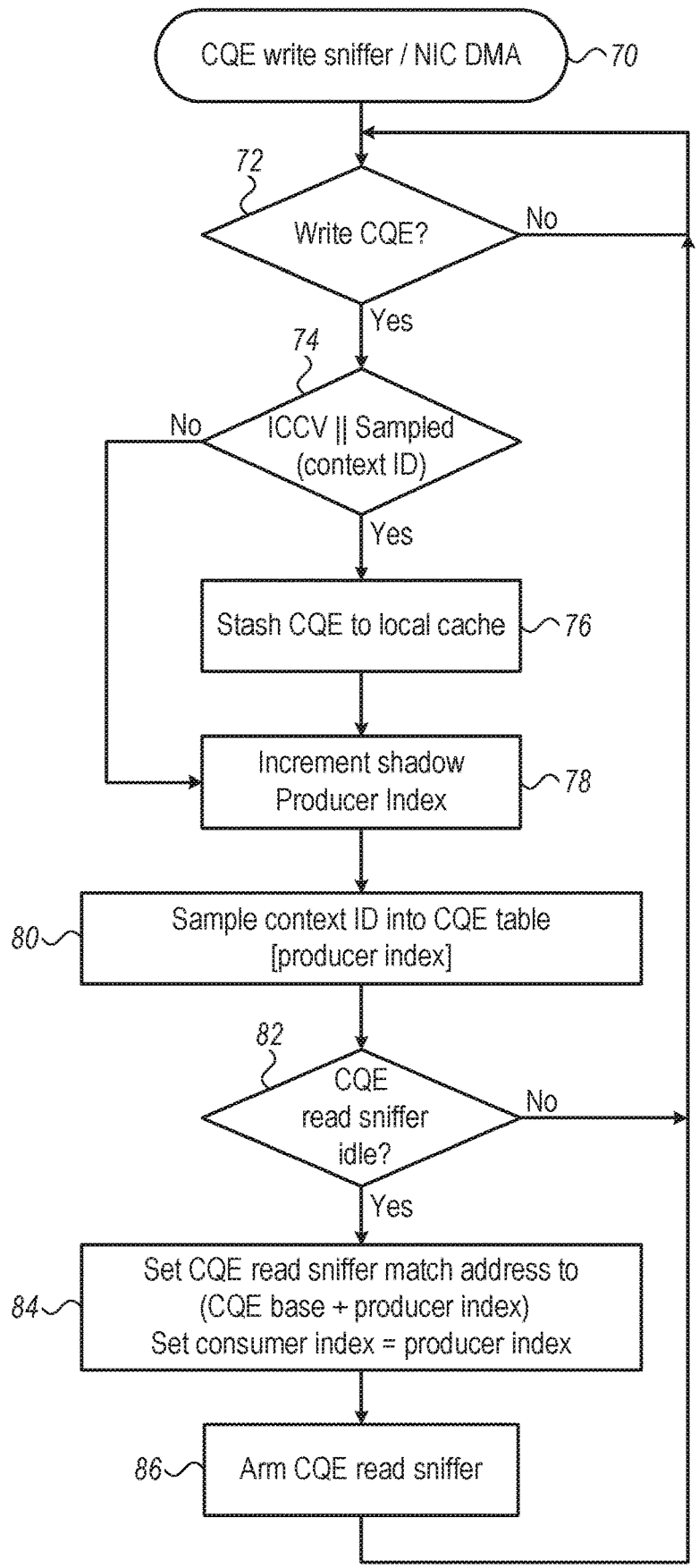
FIGS. 2, 3 and 4 are flow charts that schematically illustrate methods used in cache stashing of completion reports and context metadata, in accordance with an embodiment of the invention.
Figure 3:
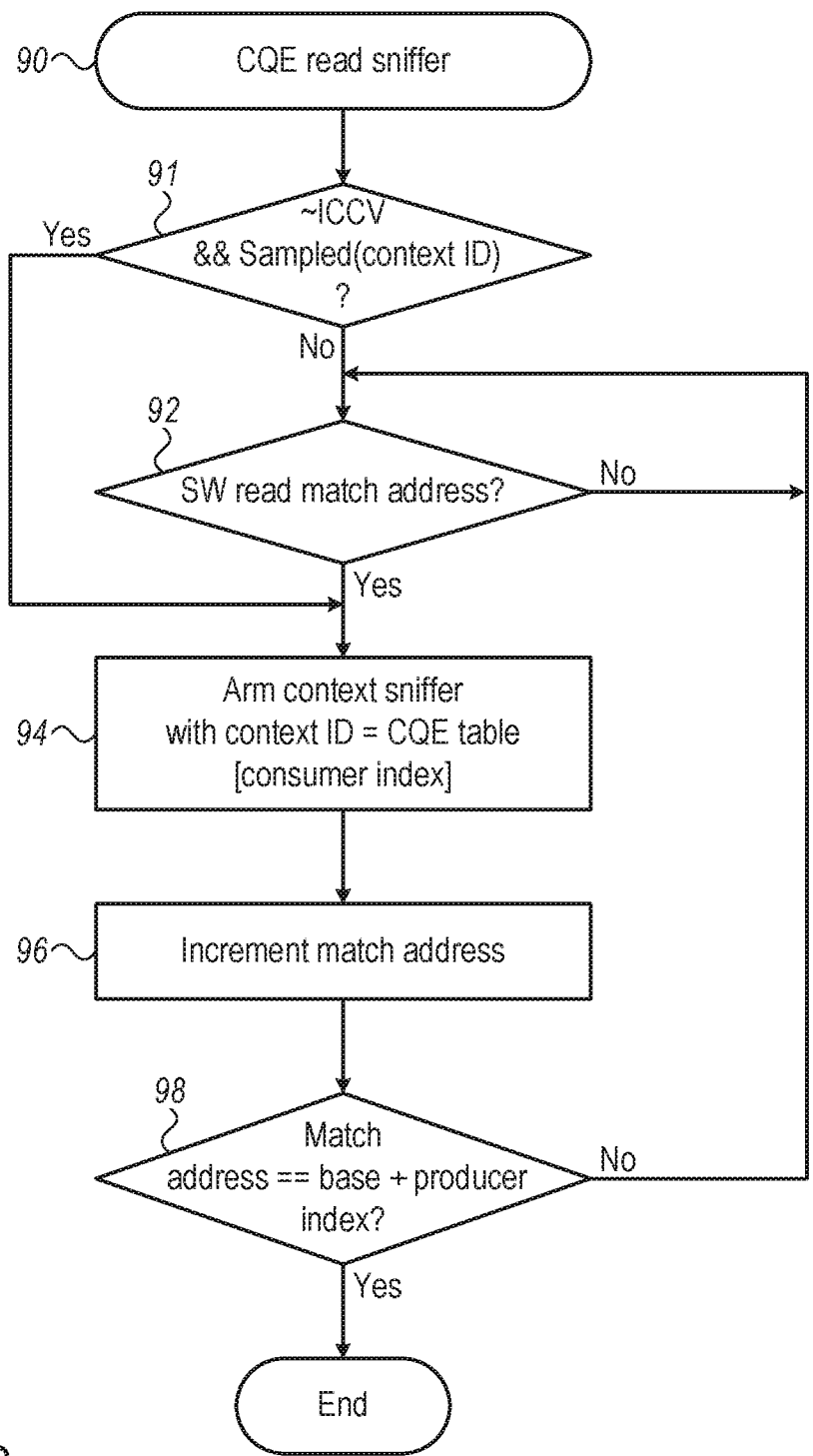
Figure 4:
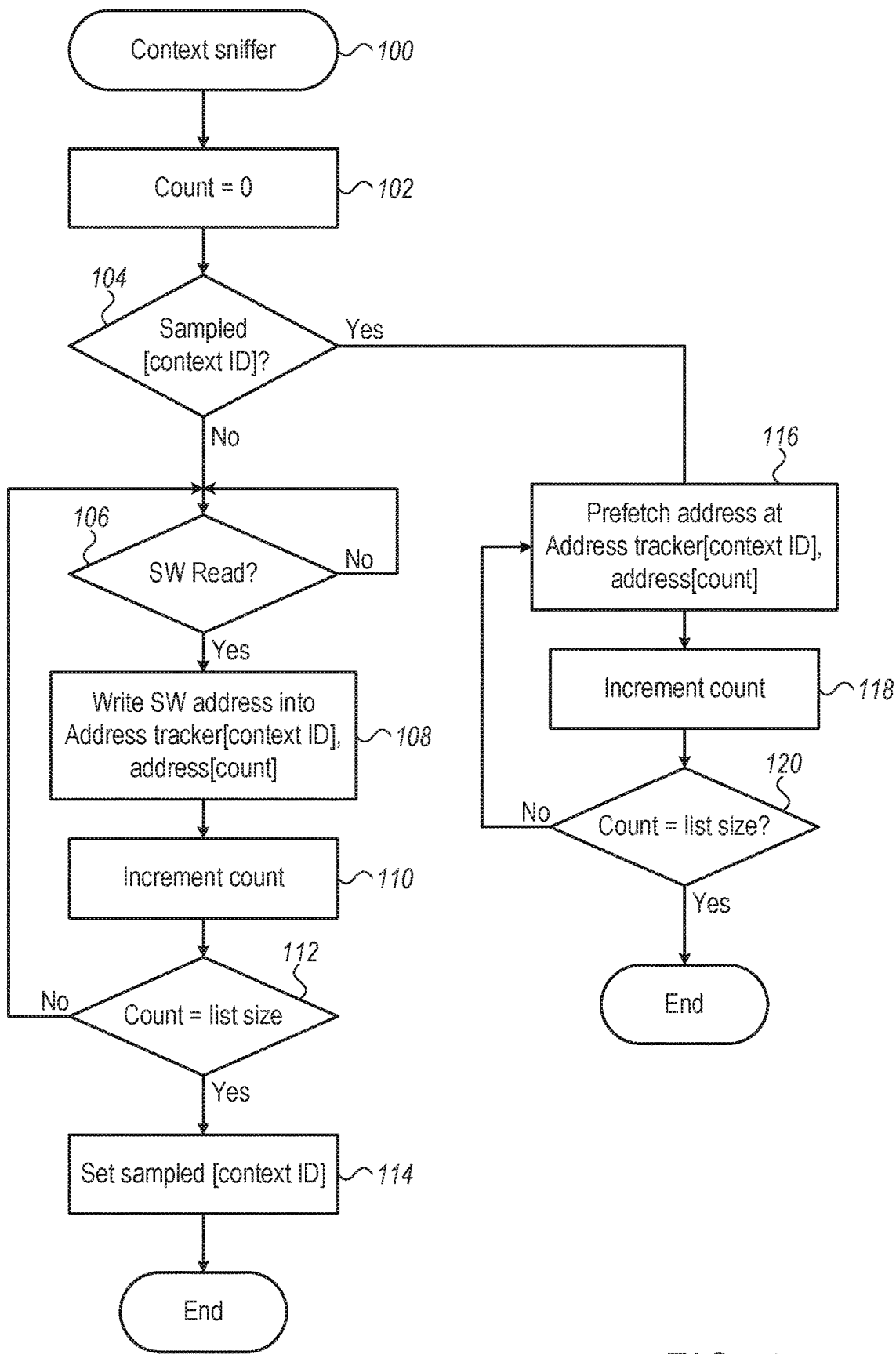

FIG. 2 is a flow chart that schematically illustrates a CQE write sniffer process 70, in accordance with an embodiment of the invention. For the sake of simplicity, this process, as well as the processes of FIGS. 3 and 4, is described with reference to a single core complex 30 with a single completion queue 50. In practice, prediction logic 56 will typically carry out these processes individually for each completion queue to which NIC 26 writes in memory 24.

CQE write sniffer process 70 is applied by prediction logic 56 in detecting and tracking DMA transactions on bus 28 in which NIC 26 writes CQEs 48 to completion queue 50. Write sniffer 70 is triggered when packet processing circuitry 42 writes a CQE via bus interface 36, at a CQE writing step 72.

Prediction logic 56 reads context ID 60 for the current CQE, and specifically checks whether valid flag 66 is set for this context ID, to indicate that the corresponding entry 64 in address tracking table 62 is up to date, at an ID checking step 74. If entry 64 is found to be valid, prediction logic 56 stashes the current CQE to cache 34, at a CQE stashing step 76. In some implementations, the corresponding context metadata 54 is also stashed to cache 34 at this stage. If entry 64 is found to be invalid, step 76 is bypassed, so that the read access of the CQE by core 32 will be exposed on bus 28. (If ICCV link 68 exists, this bypass is not needed, as the read access event by core 32 will be provided via ICCV link 68.) In addition (whether or not the entry is valid), prediction logic 56 increments its shadow producer index to indicate that another CQE 48 has been added to completion queue 50. Prediction logic 56 places context ID 60 of this latest CQE in the entry in CQE table 58 corresponding to this shadow producer index, at a context ID sampling step 80.

Prediction logic 56 checks whether its CQE read sniffer process (FIG. 3) is idle, at a read sniffing step 82. If not, CQE write sniffer process 70 returns to wait for the next CQE to be written at step 72. If the read sniffing process is idle (meaning that core 32 has already read all previous CQEs 48 from completion queue 50), prediction logic 56 sets the read sniffer match address to the location of the latest CQE written to the completion queue, at a match address setting step 84. This address is equal to the base address of completion queue 50 plus the product of the shadow producer index by the CQE size, which is assumed to be fixed. The shadow consumer index is set to the current value of the shadow producer index. Prediction logic 56 then arms the CQE read sniffer process, at a read arming step 86.

FIG. 3 is a flow chart that schematically illustrates a CQE read sniffer process 90, in accordance with an embodiment of the invention. In this process, prediction logic 56 monitors memory read operations on bus 28 in order to detect when core 32 reads each CQE 48. The detected CQE read operation serves as a trigger in detecting addresses of context metadata 54 and in stashing the context metadata to cache 34 when required.

The course of process 90 depends on whether ICCV link 68 exists and, if not, whether valid flag 66 is set for the current context ID, as determined at an initialization step 91. (If the ICCV link exists, bus sniffing is not needed, as explained above; and if the valid flag is set, further read sniffing is not needed.) If valid flag 66 is not set, read sniffer process 90 is triggered when a memory read operation on bus 28 matches the address indicated by the shadow consumer index maintained by prediction logic 56 for completion queue 50, at an address matching step 92. This matching address is equal to the base address of completion queue 50 plus the product of the shadow consumer index by the CQE size. If the address matches, prediction logic 56 arms its context sniffer process (shown in detail in FIG. 4) with the context ID 60 listed in CQE table 58 for the CQE 48 that is indicated by the current shadow consumer index, at a context arming step 94. The shadow consumer index and match address are then incremented, at an address incrementing step 96.

Prediction logic 56 checks whether the updated match address is now equal to the address indicated by the shadow producer index (meaning that the shadow consumer and producer indexes now point to the same entry in completion queue 50), at an address comparison step 98. If not, process 90 continues to check the read operations on bus 28 at step 92. Otherwise, process 90 terminates.

FIG. 4 is a flow chart that schematically illustrates a CQE context sniffer process 100, in accordance with an embodiment of the invention. Prediction logic 56 applies process 100 in order to identify the address of context metadata 52 for each context ID 60, by tracking addresses accessed by CPU 22 in system memory 24 after detecting that the CPU has read a CQE 48 having this context ID. Prediction logic 56 will then stash this context metadata to cache 34 when the CPU receives subsequent CQEs with the same context ID. Context metadata 54 for a given context ID 60 may be distributed across multiple addresses 52 in memory 24. Therefore, context sniffer process 100 enables prediction logic 56 to identify multiple addresses accessed by CPU 22 (up to a predefined list size) after read sniffer process 90 detects that the CPU has read a given CQE 48. Prediction logic 56 will then stash the context metadata from these multiple addresses to cache 34 when subsequent CQEs with this same context ID are written to completion queue 50.

When context sniffer process 100 is armed, prediction logic 56 sets an address counter to zero, at an initialization step 102. This counter tracks the number of addresses 52 in memory 24 that are read in accessing context metadata 54 for a given context ID 60. Prediction logic 56 checks the current context ID in address tracking table 62 to determine whether valid flag 66 is set for this context ID, at a validity checking step 104. As explained above, when this flag is set, it means that addresses 52 of context metadata 54 have been sampled into the address tracking table.

If the flag 66 for the current context ID 60 is not set, prediction logic 56 detects the next memory read operation on bus 28 that is carried out by software running on the corresponding core 32, at a read tracking step 106. This read operation is assumed to access context metadata for the CQE 48 that the core has just read. Prediction logic 56 writes the address 52 to which the read operation was directed to an entry 64 corresponding to the current context ID in address tracking table 62, at an address writing step 108. Prediction logic 56 increments the address counter, at a count incrementation step 110, and checks whether the count value is now equal to the predefined list size, at a count checking step 112. If not, prediction logic 56 waits for the next read operation at step 106, and then repeats the subsequent steps. Once the count value has reached the list size, prediction logic sets valid flag 66 for this context ID 60 in address tracking table 62, and the process terminates.

On the other hand, when prediction logic 56 finds at step 104 that flag 66 is set for the current context ID, it will look up the first context address in the corresponding entry 64 in address tracking table 62, and will stash context metadata 54 from the corresponding address 52 in memory 24 to cache 34, at a prefetching step 116. Prediction logic 56 then increments the address counter, at a count incrementation step 118, and checks whether the count value is now equal to the predefined list size, at a count checking step 120. If not, prediction logic 56 stashes the context metadata from the next context address in entry 64 at step 116, and then repeats the subsequent steps. Once the count value has reached the list size, all of the context metadata are assumed to have been prefetched, and the process terminates.

Although the embodiments described above relate specifically to handling of incoming data packets by NIC 26, the principles of the present invention may similarly be applied, mutatis mutandis, in other sorts of peripheral devices, and particularly I/O devices. All such alternative applications and implementations are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computing apparatus, comprising:
a central processing unit (CPU), comprising at least one core and a cache in physical proximity to the at least one core;
a system memory;
a bus connecting the CPU to the memory; and
a peripheral device, which is connected to the bus and is configured to write data items via the bus to a buffer in the system memory and to write respective completion reports to the system memory upon writing the data items to the buffer, and which is configured to detect that the CPU has read a first completion report from the system memory and then read context metadata associated with the first completion report from a given address in the system memory, and is further configured, upon writing a second completion report subsequent to the first completion report and associated with the same context metadata, to stash the second completion report and the context metadata from the given address to the cache.

2. The apparatus according to claim 1, wherein the peripheral device comprises a network interface controller (NIC), and the data items comprise data packets that are received by the NIC from a network.

3. The apparatus according to claim 1, wherein the CPU comprises multiple cores and multiple, respective caches, and wherein the peripheral device is configured to write the completion reports to multiple, different completion queues, including at least one respective completion queue for each of the cores, and to stash the completion reports and context metadata to the multiple, respective caches, depending upon the completion queues to which each of the completion reports is written.

4. The apparatus according to claim 1, wherein the peripheral device is configured to assign a respective context identifier to each completion report that it writes to the system memory, such that the completion reports that share the same context metadata are assigned the same identifier, and the peripheral device applies the context identifier in selecting the context metadata to be stashed when writing the completion reports subsequent to the first completion report.

5. The apparatus according to claim 1, wherein the peripheral device is configured to detect that the CPU has read the first completion report and then read the context metadata by sniffing data transactions on the bus.

6. The apparatus according to claim 1, wherein the peripheral device is configured to detect that the CPU has read the first completion report and then read the context metadata by detecting interactions between the at least one core and the cache.

7. The apparatus according to claim 1, wherein the peripheral device is configured to identify the given address of the context metadata by tracking addresses accessed by the CPU in the system memory after detecting that the CPU has read the first completion report.

8. The apparatus according to claim 7, wherein the peripheral device is configured to identify multiple addresses accessed by the CPU after detecting that the CPU has read the first completion report, and then to stash the context metadata from the multiple addresses to the cache upon writing the second completion report.

9. A peripheral device, comprising:
a bus interface, which is configured to connect to a bus for connection to a central processing unit (CPU), including at least one core and a cache in physical proximity to the at least one core, and to a system memory, and to read and write data to and from the system memory by direct memory access (DMA); and
processing circuitry, which is configured to write data items via the bus interface to a buffer in the system memory and to write respective completion reports to the system memory upon writing the data items to the buffer, and which is configured to detect that the CPU has read a first completion report from the system memory and then read context metadata associated with the first completion report from a given address in the system memory, and is further configured, upon writing a second completion report subsequent to the first completion report and associated with the same context metadata, to stash the second completion report and the context metadata from the given address to the cache.

10. The device according to claim 9, and comprising a network interface, wherein the data items comprise data packets that are received by the device via the network interface from a network.

11. The device according to claim 9, wherein the CPU comprises multiple cores and multiple, respective caches, and wherein the processing circuitry is configured to write the completion reports to multiple, different completion queues, including at least one respective completion queue for each of the cores, and to stash the completion reports and context metadata to the multiple, respective caches, depending upon the completion queues to which each of the completion reports is written.

12. The device according to claim 9, wherein the processing circuitry is configured to assign a respective context identifier to each completion report that it writes to the system memory, such that the completion reports that share the same context metadata are assigned the same identifier, and to apply the context identifier in selecting the context metadata to be stashed when writing the completion reports subsequent to the first completion report.

13. The device according to claim 9, wherein the processing circuitry is configured to detect that the CPU has read the first completion report and then read the context metadata by sniffing data transactions on the bus.

14. The device according to claim 9, wherein the processing circuitry is configured to detect that the CPU has read the first completion report and then read the context metadata by detecting interactions between the at least one core and the cache.

15. The device according to claim 9, wherein the processing circuitry is configured to identify the given address of the context metadata by tracking addresses accessed by the CPU in the system memory after detecting that the CPU has read the first completion report.

16. The device according to claim 15, wherein the processing circuitry is configured to identify multiple addresses accessed by the CPU after detecting that the CPU has read the first completion report, and then to stash the context metadata from the multiple addresses to the cache upon writing the second completion report.

17. A method for computing, comprising:
writing data items from a peripheral device via a bus, which connects the peripheral device to a central processing unit (CPU), including at least one core and a cache in physical proximity to the at least one core and a system memory, to a buffer in the system memory;
writing respective completion reports from the peripheral device to the system memory upon writing the data items to the buffer;

detecting that the CPU has read a first completion report from the system memory and then read context metadata associated with the first completion report from a given address in the system memory; and upon writing a second completion report subsequent to the first completion report and associated with the same context metadata, stashing the second completion report and the context metadata from the given address to the cache.

18. The method according to claim 17, wherein the peripheral device comprises a network interface controller (NIC), and the data items comprise data packets that are received by the NIC from a network.

19. The method according to claim 17, wherein the CPU comprises multiple cores and multiple, respective caches, and wherein writing the respective completion reports comprises writing the completion reports to multiple, different completion queues, including at least one respective completion queue for each of the cores, and wherein stashing the completion reports and context metadata comprises stashing the completion reports and context metadata to the multiple, respective caches, depending upon the completion queues to which each of the completion reports is written.

20. The method according to claim 17, wherein writing the completion reports comprises assigning a respective context identifier to each completion report that is written to the system memory, such that the completion reports that share the same context metadata are assigned the same identifier, and wherein stashing the context metadata comprises applying the context identifier in selecting the context metadata to be stashed when writing the completion reports subsequent to the first completion report.

21. The method according to claim 17, wherein detecting that the CPU has read the first completion report from the completion queue and then read the context metadata comprises sniffing data transactions on the bus.

22. The method according to claim 17, wherein detecting that the CPU has read the first completion report and then read the context metadata comprises detecting interactions between the at least one core and the cache.

23. The method according to claim 17, wherein detecting that the CPU has read the first completion report and then read the context metadata comprises identifying the given address of the context metadata by tracking addresses accessed by the CPU in the system memory after detecting that the CPU has read the first completion report.

24. The method according to claim 23, wherein identifying the given address comprises identifying multiple addresses accessed by the CPU after detecting that the CPU has read the first completion report, and stashing the completion reports and context metadata comprises stashing the context metadata from the multiple addresses to the cache upon writing the second completion report.

\* \* \* \* \*